United States Patent [19]

Brigham, Sr. et al.

[11] Patent Number: 4,919,257
[45] Date of Patent: Apr. 24, 1990

[54] CONDENSATE SKIMMING REFLUX COLUMN

[76] Inventors: Leslie E. Brigham, Sr.; Leslie E. Brigham, Jr., both of 2000 Rosedale Dr., Edmond, Okla. 73013

[21] Appl. No.: 378,723

[22] Filed: Jul. 12, 1989

Related U.S. Application Data

[63] Continuation-in-part of Ser. No. 177,108, Apr. 4, 1988, abandoned.

[51] Int. Cl.$^5$ .................................... B01D 3/32
[52] U.S. Cl. ................................ 202/158; 55/172; 55/176; 196/111; 202/181; 202/193; 202/196; 202/197; 202/254; 203/4; 203/99; 210/188; 210/521
[58] Field of Search .............. 202/158, 196, 197, 254, 202/181, 193, 237; 203/14, 40, 1, 4, 99, DIG. 9; 159/43.1, 31; 55/172, 176; 210/188, 521; 196/111

[56] References Cited

U.S. PATENT DOCUMENTS

| | | | |
|---|---|---|---|
| 2,375,590 | 5/1945 | Schonberg et al. | 210/521 |
| 2,812,827 | 11/1957 | Worley et al. | 55/176 |
| 3,132,987 | 5/1964 | Sinex | 159/31 |
| 3,162,515 | 12/1964 | Connors et al. | 159/31 |
| 3,273,318 | 9/1966 | Meyer | 55/176 |
| 3,450,603 | 6/1969 | Meyers et al. | 159/31 |
| 3,451,897 | 6/1969 | Welch | 159/31 |
| 3,541,763 | 11/1970 | Heath | 159/31 |
| 3,797,203 | 3/1974 | Murdock, Sr. | 55/176 |
| 4,008,729 | 2/1977 | Crizinsky | 202/170 |
| 4,010,065 | 3/1977 | Alleman | 159/31 |
| 4,026,681 | 5/1977 | Roskelley | 159/31 |
| 4,115,084 | 9/1978 | Coggins | 55/176 |
| 4,280,867 | 7/1981 | Hodgson | 159/31 |
| 4,335,001 | 6/1982 | Yves et al. | 210/521 |
| 4,390,398 | 6/1983 | Coker et al. | 202/161 |
| 4,608,119 | 8/1986 | Rowland | 159/31 |

Primary Examiner—Virginia Manoharan
Attorney, Agent, or Firm—Robert K. Rhea

[57] ABSTRACT

In a gas dehydration system utilizing glycol a condensate skimming reflux column separates and skims natural gas condensate off glycol by a settling tank-type reservoir having a syphon-type glycol outlet to a reflux section spaced a predetermined distance below a condensate outlet pipe.

1 Claim, 1 Drawing Sheet

CONDENSATE SKIMMING REFLUX COLUMN

CROSS-REFERENCE TO RELATED APPLICATION

This application is a continuation-in-part of an application filed by us in the United States Patent and Trademark Office on Apr. 4, 1988, Ser. No. 07/177,108 for CONDENSATE SKIMMING REFLUX COLUMN, now abandoned.

BACKGROUND OF THE INVENTION

1. Field of the Invention.

The invention relates generally to the use of a multi-sectional atmospheric vessel to separate and skim natural gas condensate from glycol and function as a reflux column in the purification process of a natural gas glycol dehydration system.

2. Description of the Prior Art.

Standard glycol dehydration systems use a reflux column which comprises a single section atmospheric vessel containing reflux media. The problem with current systems is that natural gas condensate, and/or lubricating oil leaking by pistons in a gas compressor, absorbed by the glycol during the dehydration process is introduced into the glycol purification reconcentrator where high temperatures flash the condensate leaving a carbon byproduct which degenerates glycol, pollutes the environment and reduces system efficiency. The gas condensate problem is overcome by the apparatus of this invention.

The most pertinent prior patent is believed to be U.S. Pat. No. 3,797,203 which discloses apparatus for separating heavier from lighter liquid components of different specific gravity (water vs oil) in an upright vessel having a comingled fluid inlet port disposed between a lower heavier fluid outlet port and an upper lighter fluid outlet port with conical screens interposed between the inlet port and upper outlet port for coalescing heavier fluid to fall by gravity to the bottom of the vessel.

This invention is distinctive over this patent by, in addition to gravity separation of fluids of different specific gravities (glycol vs gas condensate including oil) it processes the heavier fluid in a manner not disclosed by this patent.

SUMMARY OF THE INVENTION

An upright casing or column is mounted on and communicates with a glycol reconcentrator in a gas dehydration system. The casing is partitioned to form a settling tank-type reservoir in juxtaposition with a reflux section intermediate the ends of the casing. A mixture of gas condensate and glycol enters the reservoir adjacent its upper limit. The glycol settles out of the gas condensate by gravity enhanced by heat transfer (convection) from the reboiler of the dehydration system through partition walls forming the reservoir thus forming a glycol gas condensate interface. Glycol is drained from the bottom end portion of the reservoir to the reflux section by a syphon-type outlet when the glycol gas condensate interface level is above a predetermined level as presently explained. Gas condensate flows by gravity to a remote sump through a gas condensate reservoir outlet spaced above the upper limit of the glycol outlet level.

The objects of this invention are to increase the efficiency of a glycol dehydration apparatus by separating and removing natural gas condensate from wet glycol by utilizing normally wasted heat exhausted from a glycol reconcentrating reboiler which preheats a reservoir containing glycol and natural gas condensate mixture while providing a reflux effect for the reconcentration unit and minimizing environmental pollution of the immediate area surrounding liquid dessicant dehydration systems.

DESCRIPTION OF THE PREFERRED EMBODIMENTS

Figure 1:
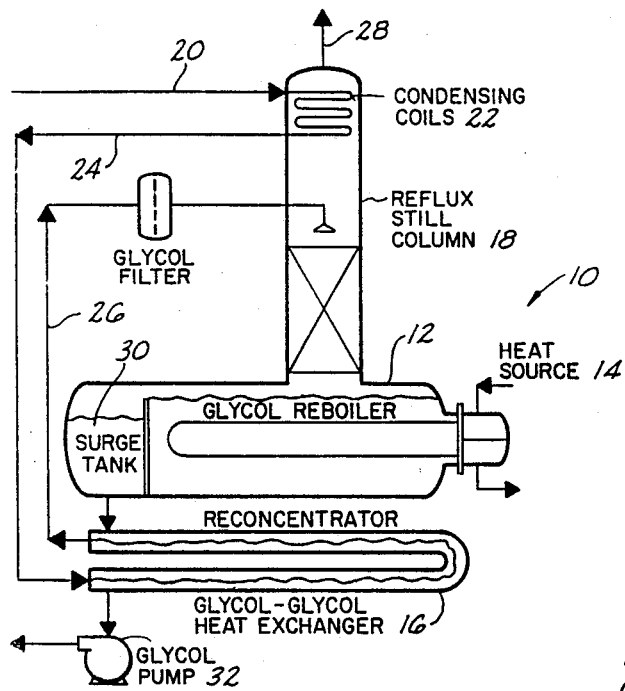
FIG. 1 is a system diagram of a prior art liquid dessicant reconcentrating system; and, FIG. 2 is a vertical cross sectional view of a gas condensate skimming reflux column.

Like characters of reference designate like parts in those figures of the drawings in which they occur.

In the drawings:

Referring first to FIG. 1, the reference numeral 10 indicates a liquid dessicant reconcentrating system comprising a glycol reboiler 12 supplied with a heat source 14 which includes a heat exchanger 16 and a reflux column 18 mounted on the reboiler 12. Wet glycol from a moisture absorber, not shown, enters the reflux column 18 through a line 20 and flows through condensing coils 22 to the heat exchanger 16 through a coil outlet line 24. Glycol from the heat exchange unit flows through another line 26 into the column 18 and into the reboiler 12. Water vaporized by the heat in the reboiler exits the column through a top vent 28 while the glycol flows from the reboiler surge tank 30 through the heat exchanger 16 and is picked up by a glycol pump 32 and returned to the moisture absorber as dry or reconcentrated glycol which forms the liquid dessicant in most natural gas dehydration systems.

The above description is substantially conventional with glycol reconcentrating or drying of liquid dessicants and forms no part of the present invention other than to show the combination with which the present invention is used.

Figure 2:
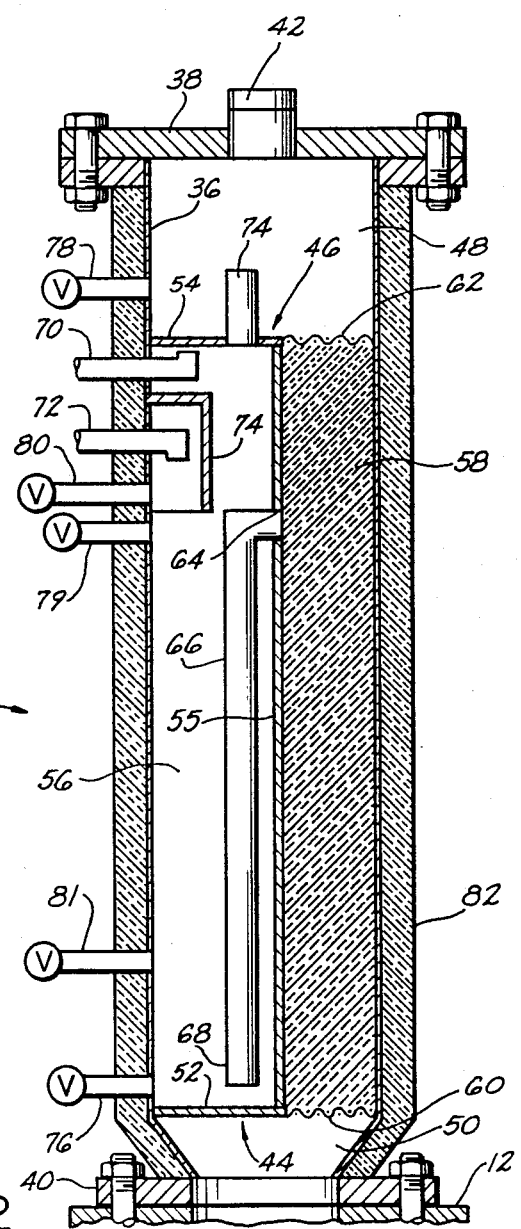

Referring also to FIG. 2, the reference numeral 35 indicates the device which is generally cylindrical in overall configuration comprising an upright column or casing 36 having a cap or top 38 provided with a cap 42 at its upper end and its bottom end provided with an outstanding annular flange 40 connected with the reboiler boiler 12 in place of the column 18. The bottom end portion of the casing is transversely divided by horizontal partition means 44. Similarly a horizontal partition means 46 extends transversely of the casing adjacent its upper end for defining casing top and bottom chambers 48 and 50 respectively.

The lower partition means 44 comprises a semicircular imperforate partition 52 and the upper partition means similarly comprises a co-operating semicircular imperforate partition 54. The casing is further diametrically divided longitudinally between the partition means 44 and 46 by a partition 55 in cooperation with the imperforate partitions 52 and 54 to form a reservoir 56 and a juxtaposed or opposite refluent containing chamber 58 containing a quantity of loosely packed particles indicated by the insulation cross section. The upper and lower limits of the refluent containing chamber 58 is defined by foraminated partitions 60 and 62 respectively. The foraminated semicircular partitions may be expanded metal, or the like, providing free flow of vapors and liquid through the refluent containing chamber 58.

Spaced downwardly in its upper end limit, as viewed from the drawing, the diametric partition 55 is provided with a liquid level outlet port 64 connected with a syphon-like drain 66 forming a liquid level control means having its lower end portion 68 disposed in the bottom end portion of the reservoir 56 adjacent the lower imperforate partition 52 for the purpose of draining glycol, as hereinafter explained.

The casing 36 is provided, adjacent the upper partition 54, with an inlet tube 70 for admitting a mixture of wet glycol and gas condensate with the inward end of the tube 70 turned upward with its open end facing the depending surface of the imperforate partition 54. Spaced downwardly from the tube 70 a predetermined distance, as hereinafter explained, a gas condensate or lube oil exit tube 72 extends through the wall of the casing 36 with its inner open end turned downwardly toward the bottom end of the reservoir 56. A shield or baffle 74 anchored to the inner wall surface of the casing 36 extends downwardly a selected distance from a position above the outlet tube 72 but terminates no lower than the bottom of the axis of the glycol outlet port 64 for the purpose of preventing turbulent fluid from the tube 70 interfering with the condensate drain tube 72. The reservoir 56 is vented to the atmosphere through the casing vent 42 by a gas vent tube 74 extending through the top semicircular partition 54. The reservoir 56 is provided with a liquid drain 76 adjacent its lower limit.

Upper and lower vertically spaced and vertically overlapping valve equipped sight glass connections 78–79 and 80–81 through the wall of the casing 36 are provided for a pair of conventional sight glasses. The casing is preferably insulated as at 82.

Operation

Assuming the device 35 has been operatively mounted on a glycol reconcentration unit, natural gas condensate in solution with glycol enters the casing 36 through the inlet 70. The reservoir 56 acts as a skimmer wherein the gas condensate and glycol form an interface.

The interface of the glycol and condensate is determined by the following formula:
Triethylene glycol specific gravity=1.254
Condensate specific gravity=0.9309
Desired overall depth of total fluid in reservoir=32"
Desired depth of glycol in reservoir=21"
Desired depth of condensate in reservoir=11"

$$\frac{\text{glycol depth} \times \text{spec. gr.} + \text{cond. depth} \times \text{spec. gr.}}{\text{glycol specific gravity}} = \text{interface}$$

Substituting values:

$$\frac{21 \times 1.254 + 11 \times 0.9309}{1.254} = 29.16$$

Overall depth of total fluid = 32.00"
Minus − 29.16

Therefore the condensate outlet 72 is spaced 2.84" above the glycol outlet port 64.

Any gas entering the reservoir 56 with the glycol/condensate is vented to the atmosphere through the reservoir vent 74. Normally wasted heat exhausted from the reboiler 12 through the reflux section 58 heats the partitions 52 and 55 and the glycol and gas condensate in the reservoir 56 which assists specific gravity separation of the fluid mixture. As glycol accumulates in the reservoir it flows into the reflux section 58 and through the refluent media and expanded metal 60 partition into the reboiler 12. As gas condensate accumulates it flows through outlet 72 by gravity to a collecting sump, not shown.

Vapors such as steam generated by the reboiler 12 heating wet glycol rises through the refluent media chamber 58, which collects any glycol vapors and the steam exits to the atmosphere through the casing vent 42.

In addition to at least minimizing environmental pollution if not completely eliminating it, applicants' device effects a considerable saving in fuel gas for operating a glycol reconcentrating unit.

By way of example: In a five day test period at a gas well production site, in the state of Okla., with the glycol pump operating at 36 gallons per minute and a reboiler temperature of 390° F. an average of 2025 cubic feet per day of gas was consumed for operating the system.

After installing applicants' device 35 and over a six day test period, at the same location, using the same glycol reconcentrating system with a glycol pump rate of 23 gallons per minute and a reboiler temperature of 385° F. an average of 1320 cubic feet per day of gas was consumed. This equals 705 cubic feet per day of gas saved. Stated another way, applicants' device effected a 35% savings in fuel consumption and 35% less exhaust emission to the atmosphere or surrounding terrain.

Obviously the invention is susceptible to change or alterations without defeating its practibility. Therefore, we do not wish to be confined to the preferred embodiment shown in the drawings and described herein.

We claim:
1. In an apparatus for separating natural gas condensate from glycol in a gas dehydration system having a glycol reconcentration unit, the improvement comprising:
   an upright elongated reflux still column open at its top end to the atmosphere and mounted on and in communication at its bottom end with the reconcentration unit;
   partition means including upper and lower horizontal partitions and a diametric partition extending longitudinally of the column between said partitions for longitudinally and transversely dividing said column intermediate its ends to form upper and lower compartments at its respective end portions and a pair of juxtaposed compartments intermediate its ends,
   co-operating portions of said horizontal partitions being foraminated and forming respective end limits of refluent media containing chamber,
   said juxtaposed compartments forming a fluid separation reservoir and said chamber communicating at its respective ends with the upper and lower compartments;
   a glycol and natural gas condensate mixture inlet port in the wall of said column adjacent the upper limit of the reservoir; a natural gas condensate outlet port spaced below said inlet port;
   a gas vent port at the reservoir upper limit communicating with the column upper compartment;

liquid level control means in the reservoir communicating with a liquid level outlet port in the partition means forming the juxtaposed compartments spaced below the natural gas condensate outlet port and communicating with the refluent media containing chamber for draining glycol from the bottom end portion of the reservoir, said level control means including an elongated conductor having one end axially connected with the liquid level output port and its other end disposed adjacent the lower limit of the reservoir; and baffle means for preventing a direct fluid communication between the natural gas condensate outlet port and the glycol and natural gas condensate mixture inlet port.

* * * * *